United States Patent
Illerhaus

(10) Patent No.: US 7,214,160 B2
(45) Date of Patent: May 8, 2007

(54) PLANET CARRIER ASSEMBLY

(75) Inventor: Dietmar Illerhaus, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 104 days.

(21) Appl. No.: 10/900,660

(22) Filed: Jul. 28, 2004

(65) Prior Publication Data
US 2005/0026744 A1 Feb. 3, 2005

(30) Foreign Application Priority Data
Jul. 29, 2003 (DE) ................. 103 34 459

(51) Int. Cl.
*F16H 57/08* (2006.01)
(52) U.S. Cl. ...................... 475/331; 475/346
(58) Field of Classification Search ............. 475/331, 475/334, 346, 347, 348
See application file for complete search history.

(56) References Cited

U.S. PATENT DOCUMENTS

| | | | | |
|---|---|---|---|---|
| 3,527,121 A | * | 9/1970 | Moore | 475/338 |
| 4,799,564 A | * | 1/1989 | Iijima et al. | 180/65.5 |
| 4,885,959 A | * | 12/1989 | Shinjo et al. | 475/347 |
| 5,382,203 A | * | 1/1995 | Bellman et al. | 475/331 |
| 5,466,198 A | * | 11/1995 | McKibbin et al. | 475/346 |
| 5,470,286 A | * | 11/1995 | Fan | 475/331 |
| 6,561,945 B2 | * | 5/2003 | Shattuck et al. | 475/331 |
| 6,651,336 B1 | | 11/2003 | Bauknecht et al. | |
| 6,663,531 B2 | | 12/2003 | Skrabs | |
| 2004/0235610 A1 | * | 11/2004 | Jang et al. | 475/331 |

FOREIGN PATENT DOCUMENTS

| | | |
|---|---|---|
| DE | 1 913 158 | 4/1965 |
| DE | 1 193 377 | 5/1965 |
| DE | 36 37 299 | 5/1987 |
| DE | 43 02 844 | 2/1993 |
| DE | 44 21 931 | 6/1994 |
| DE | 195 36 177 | 9/1995 |
| DE | 199 12 719 | 9/2000 |
| DE | 199 45 242 A1 | 3/2001 |
| DE | 100 14 464 A1 | 9/2001 |
| EP | 0 271 416 | 6/1988 |
| JP | 59106761 A * | 6/1984 |
| JP | 62288747 A * | 12/1987 |

\* cited by examiner

*Primary Examiner*—David D. Le
(74) *Attorney, Agent, or Firm*—Davis Bujold & Daniels, P.L.L.C.

(57) ABSTRACT

The invention relates to a guide washer assembly (1) of a planet carrier for a planetary transmission having two guide washers (2, 3) which are interconnected via adequate connecting elements and held parallel at a distance from each other, the connecting elements being integral component parts of at least one of the two guide washers (2, 3). For reducing the assembly, production and storage costs and, at the same time, ensuring the durability of the guide washer assembly (1), the invention provides for the connecting elements (4, 5, 6) to be formed as dents (7) in at least one of the two guide washers (2, 3).

11 Claims, 2 Drawing Sheets

PLANET CARRIER ASSEMBLY

This application claims priority from German Application Serial No. 103 34 459.4 filed Jul. 29, 2003.

Field of the Invention

The invention concerns a guide washer assembly of a planet carrier for a planetary transmission.

BACKGROUND OF THE INVENTION

It is generally known that a planet a carrier constitutes an important part in a planetary transmission. According to DE 199 45 242 A1, such a planet carrier comprises one spider shaft on one end of which are non-rotatably fastened two guide washers (also called spider plates). For this purpose, said two guide washers are aligned parallel with each other and firmly interconnected at a distance from each other so that a clearance is formed between them for accommodating planetary gear wheels. In this prior art, the two guide washers are assembled by means of special rivet bolts whose double-ended, front-side pivots are clamped in receiver apertures of the two guide washers.

According to DE 100 14 464 A1, the planet gears proper can be supported upon so-called planet bolts located and fastened in the clearance formed by the two guide washers.

A disadvantage in both solutions is the multiplicity of separate parts needed for the manufacture of the planet carrier and the production costs associated therewith.

It is further known to produce such a planet carrier as a forging part which involves comparatively heavy parts which are expensive because of the finishing costs that are needed.

In another alternative, the planet carrier comprises one guide washer consisting of one sheet deformable part with segmentally crimped links inserted and welded in slotted receiver apertures in the opposite second guide washer. Those sheet deformable parts are relatively complex and hard to control since, among other things, the elongated receiver apertures in the second guide washer negatively influence the strength of the part regarding the notch effect, and the segmental welding of the links can produce problematic courses of welding seams or warping of the part.

Considering this background, the problem on which the invention is based is to develop a generic planet carrier so that it can be produced with a small number of separate parts, the same as with an assembly technique of reliable processing and of reasonable cost.

SUMMARY OF THE INVENTION

The invention avails itself of the knowledge that the number of separate parts of such a planet carrier can be reduced when the connecting means needed for the connection of the two guide washers are made on at least one of said two guide washers. To this extent, the invention follows the above mentioned planet carrier with the highly crimped connecting links on one guide washer. Differing from said prior art, however, it is provided in the inventive guide washer assembly that the elements for connecting the two guide washers are designed as recesses in at least one of the two guide washers, the axial length of which essentially defines the subsequent distance between the guide washers.

The connecting elements can be made on only one of the two guide washers, but also on both guide washers. The last mentioned alternative is mainly advantageous because, for example, by a reciprocal arrangement of the connecting elements on both guide washers, these can be produced as so-called equal parts whereby the costs for tools and storage can be clearly reduced.

In a preferred development of the invention, in addition, it is provided that the connecting elements are made of a compact surface over the spatial distance between the two guide washers. Thereby are mechanically created, specially stable, connecting means with which comparatively high torques can be transmitted with a small number of connecting means. It is of special advantage in this connection that the connecting elements have a vaulted, tapered or cylindrical geometry.

To produce the guide washer assembly, the connecting elements of one guide washer are butt welded or riveted to the other guide washer. In the latter case, there are apertures for passing a rivet both on the front-side free end of the connecting elements and on the respective coordinated points of the other guide washer.

In one other alternative of the inventive guide washer assembly, it is provided that the connecting elements have on their free front-side end a diameter equal to or smaller than the diameter of the apertures corresponding thereto in the other opposite guide washer.

Inasmuch as the alternative is selected with diameters of the same size, a pressing connection suggests itself for the production of which the temperature of one of the two guide washers is lowered or raised so as to have somewhat reduced or enlarged measurements, compared to the other guide washer. After insertion of the connecting elements in the receiver apertures, the same as adaptation of temperature between the two guide washers, the free end of the connecting means is fastened on the receiving aperture in a manner known as a press fit.

Another development of the invention provides that the free front-side end of the connecting elements are designed conically so that they can serve as centering sections with the aid of which the assembly of the two guide washers is to be better accomplished.

The connecting elements on at least one guide washer, the same as the other geometric characteristics of the guide washer, are preferably produced by a sheet deforming process which is a combination of cold hammering, deep drawing and precision blanking processes.

Besides, it is deemed advantageous that each connecting element has in the area of its free front-side end, an annular shoulder of a diameter larger than the diameters of the coordinated apertures in the other guide washer. In a first assembly step, the annular shoulder forms for the other guide washer; in a successive assembly step, a bearing area which is provided and adequate, for example, for connecting process forces to be introduced in the assembly of parts.

In addition, the guide washer assembly can be produced so that the connecting elements are fastened on the outer side of the respective other assembly washer by peening, welding, caulking, or via a snap ring gripping in a peripheral groove on the free front-side end of the assembly elements.

It is further convenient that both guide washers have apertures for receiving axes of rotation or shafts of those planet gears to be carried by the planet carrier.

To facilitate the assembly, centering and/or assembly apertures can be formed additionally, at least in one of the two guide washers, in which can be inserted the centering and/or assembly tools.

Finally, it is deemed convenient that on at least one of the two guide washers there are made an outer plug-in toothing over the whole periphery or only over peripheral segments of the guide washer. The plug-in toothing can be used, for example, to non-rotatably connect the guide washer assembly of the planet carrier with one other part of the transmission.

BRIEF DESCRIPTION OF THE DRAWINGS

The invention will now be described, by way of example, with reference to the accompanying drawing showing two embodiments of the inventive guide washer assembly which.

DETAILED DESCRIPTION OF THE INVENTION

Figure 1:
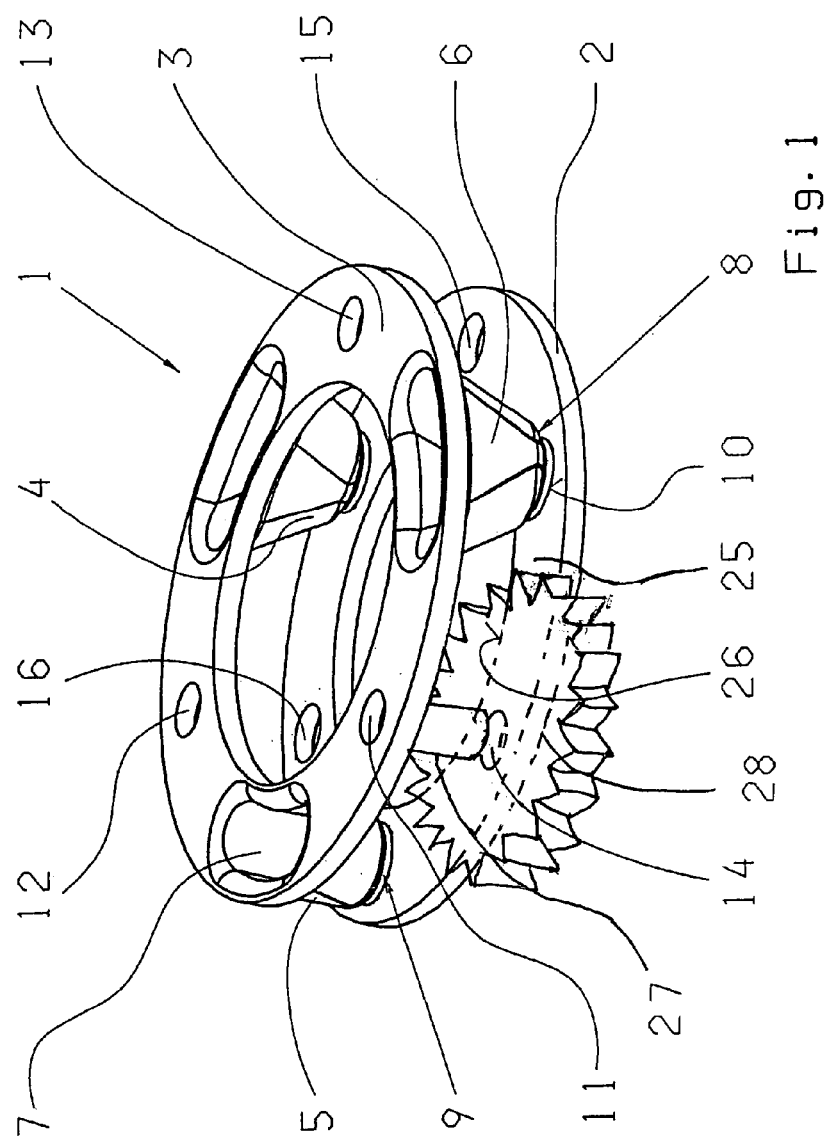
FIG. 1 is a perspective view of one guide washer assembly of a planet carrier in a first embodiment.

Accordingly, as is understood from FIG. 1, the object of the invention is a guide washer assembly 2 of a planet carrier for a planetary transmission which is usually connected via a welding seam with a spider shaft (not shown here).

In the shown embodiment, the inventive guide washer assembly 1 consists of two round guide washers 2 and 3 aligned parallel with each other and firmly interconnected via connecting elements 4, 5, 6.

The connecting elements 4, 5, 6 are formed from the guide washer 3 in a special manufacturing process consisting of a combination of precision blanking, crimping and deep drawing processes so that in this embodiment they are vault-like designed forming a cavity 7 with spacers and assembly structures.

To fasten the connecting elements 4, 5, 6 with the other guide washer 2, they have an area of preferable cylindrical design available with reduced external diameter in their free front-side end so that, in said area of each connecting element 4, 5, 6, one annular shoulder 8 is formed.

After plugging in the free front-side end of the connecting elements 4, 5, 6 into a receiver aperture 10 in the opposite guide washer 2, a provisional connection results between the two guide washers 2 and 3 in which said annular shoulder 8 abuts on an inner side 25 of the guide washer 2 which has no connecting means.

This constructional step ensures that both guide washers 2, 3 be aligned also effectively plane parallel with each other. In an optional following crimping operation, it is additionally ensured by the annular shoulders 8 that the connecting elements 4, 5, 6, under defined conditions, can absorb forces of the connecting process. Alternatively or additionally during the assembly process, they can be held up in the cavities 7 of the connecting elements 4, 5, 6 by means of a suitable tool.

As long as a welding or caulking of the two guide washers is desired, the needed connecting seams can be placed, for example, upon the outer side of the guide washer 2 which has no connecting means.

As can easily be understood with the aid of FIG. 1, it is possible by the invention with only two parts to produce a guide washer assembly 1 that is mechanically stable, quick and exact with regard to the plane parallelism of the two guide washers 2, 3. As mentioned above, if the two guide washers 2, 3 are designed as equal parts, the production costs for such a guide washer assembly can also be satisfactorily lowered.

As it can further be understood from FIG. 1, there are also cut out or punched in the guide washer 3 apertures 11, 12, 13 for receiving supporting axes 27 (so-called planetary bolts) for the planetary gears 28 to be inserted between the two guide washers 2, 3, one example of a supporting axle or axis 27 and a planetary gear 28 is shown in FIG. 1 it being understood that there will be a supporting axle or axis 27 and a planetary gear 28 accommodated by each aperture 11, 12 and 13. Geometrically corresponding apertures 14, 15, 16 for said supporting axes 27 are clearly visible in the guide washer 2 having no connecting means.

In the guide washer assembly 1, the planetary gears 28 can be inserted prior to the connection between said two guide washers 2, 3 having been created with the aid of the connecting elements 4, 5, 6. The planetary gears 28 with their planetary bolts or axle 27 obviously can also be inserted later, that is, after the two guide washers 2, 3 have been joined. In this case, the apertures 14, 15, 16 can also be used for centering the two guide washers 2, 3 for the assembly. Only one of the axles 27 and its corresponding planetary gears 28 is shown in the drawing for better clarity.

Figure 2:
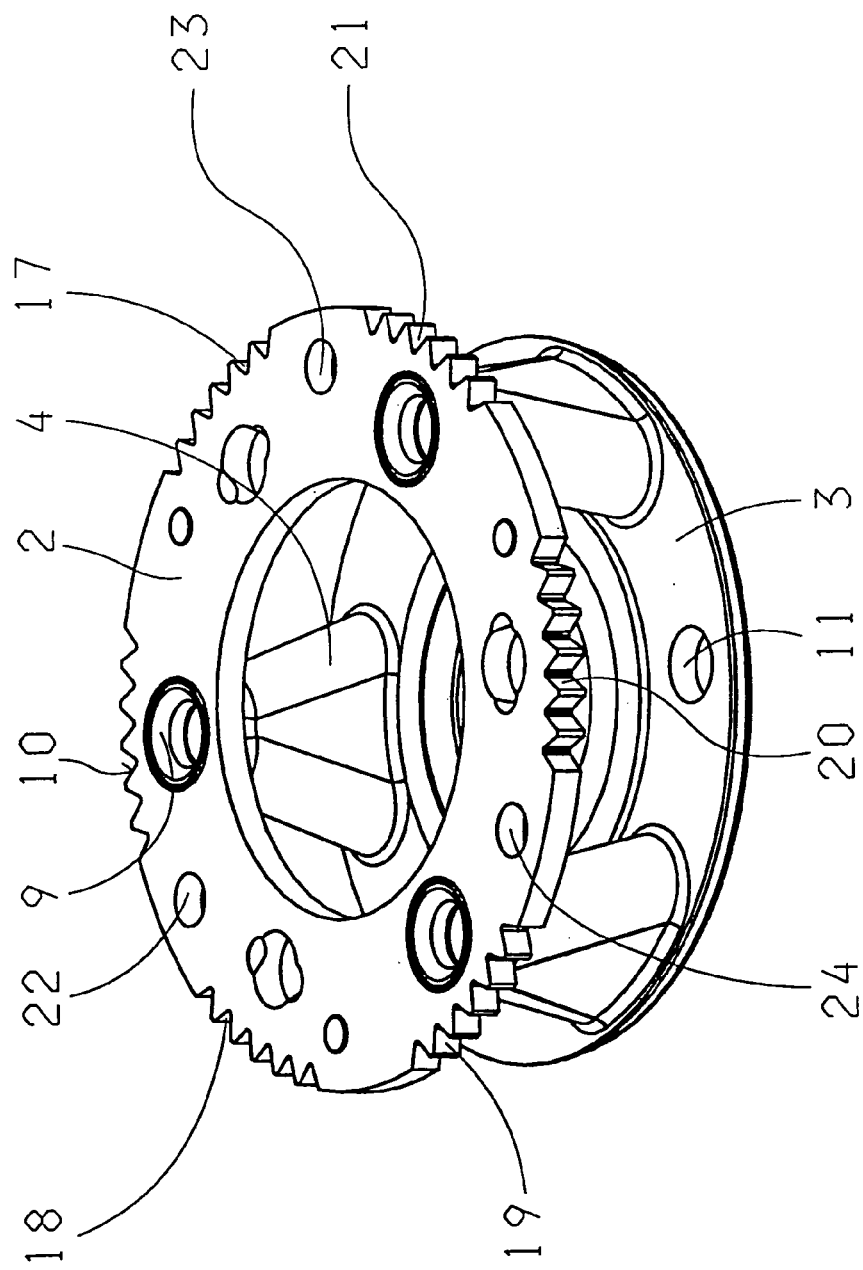
FIG. 2 is a graph like in FIG. 2 in another alternative.

FIG. 2 shows a guide washer assembly very similar to the construction in FIG. 1. As made clear by comparing said two graphs, the guide washers assembly, according to FIG. 2, is shown in a view upon the outer side of the guide washer 2 which has no connecting means so that the receiver aperture 10 thereof for the connecting elements 4, 5, 6 can be clearly seen. In said aperture 10, respectively penetrate the cylindrically designed free front-side end of the connecting elements 4, 5, 6 which, in this embodiment of the invention, has been connected by caulking with the guide washer 2 which has no connecting means.

The guide washer 2 having no connecting element has further centering apertures 22, 23, 24 available through which the centering tools or the receiver bolts of an assembly device can be plugged in as an assembly aid in the construction of the two guide washers 2, 3. The same as outer and inner diameters of the guide washers, the apertures 11, 12, 13 or 10 can be additionally used for centering, if needed.

Finally, on the outer periphery of the guide washer 2 which has no connecting means, one plug-in toothing 17, 18, 19 20, 21 is made which extends all together over five peripheral segments. With the aid of said outer peripheral toothing, the guide washer 2 which has no connecting means or the finally assembled guide washer assembly of respective planet carriers can be non-torsionally fastened on one other part of the aforementioned planetary transmission. Said outer plug-in toothing can obviously also extend over the whole periphery of the guide washer 2 which has no connecting means or of both guide washers 2, 3.

It should not be left unmentioned that on an inner periphery 26 of one or both guide washers 2, 3 can be fastened the spider or planet carrier shaft (not shown here (FIG. 1)).

All the apertures, connecting elements and toothings shown on both guide washers 2, 3 are preferably produced by the above mentioned combined cold-hammering, deep drawing and precision blanking processes.

The number of connecting elements 4, 5, 6 is, at the same time, not fixed at three connecting elements even if said number appears advantageous regarding the production cost and the space available.

In a design of both guide washers 2, 3 as equal parts, the described connecting elements are upon each one of the guide washers 2, 3. In such a case, it seems convenient to make only two connecting elements on each of the two guide washers 2, 3 which add up to four connecting elements and are preferably formed evenly distributed on the guide washers 3, 4 of the guide washer assembly.

In another design of the two guide washers as equal parts, both guide washers can be provided to have the same number of connecting elements, the height (or the extension oriented in axial direction of the guide washers) of the individual connecting elements respectively amounting to half the distance between two guide washers. In the assembly of the planet carrier, the free ends of the connecting elements are accordingly superposed flush with each other and interconnected by pairs, for example, by a welding process ("KE welding"). The great axial distances between the two guide washers can also be bypassed hereby for step planetary gears.

In another design of the two guide washers—which are here again designed as different parts—both guide washers can be provided with the same number of connecting elements of different height (or different extension oriented in axial direction of the guide washers; the free ends of the connecting elements of the first guide washer being, during assembly of the planet carrier, being superposed flush with each other or with centering on the free ends of the connecting elements of the second guide washer and being interconnected in a material-locking, a form-locking or a force-locking manner by means, for example, of a welding process, a soldering process, caulking or extrusion.

A particular advantage of the inventive guide washer assembly is that for the construction thereof only two separate parts 2, 3 are needed which parts, by adequate selection of the geometry of the guide washer, arrangement of the connecting elements 4, 5, 6, the same as of the receiver apertures 10 for said connecting elements 4, 5, 6, can also be produced with the same construction. This reduces the tool and storage costs.

In addition, the construction of the guide washer assembly described can be so favorably produced that mechanical finishing cost can be extensively eliminated.

Besides, a circular connecting areas (cylindrical or conical centering diameters 9; receiver apertures 10) of both guide washers 2, 3 are, technically considered, much more advantageous regarding the durability of parts than the slotted holes for receiving the connecting links of the known planet carrier described above.

REFERENCE NUMERALS 1 guide washer assembly of a planet carrier
2 guide washer
3 guide washer
4 connecting element
5 connecting element
6 connecting element
7 cavity
8 shoulder on the connecting element
9 centering diameter
10 aperture in the guide washer
11 aperture for a planet axle
12 aperture for a planet axle
13 aperture for a planet axle
14 aperture for a planet axle
15 aperture for a planet axle
16 aperture for a planet axle
17 outer plug-in toothing
18 outer plug-in toothing
19 outer plug-in toothing
20 outer plug-in toothing
21 outer plug-in toothing
22 aperture for receiving a center tool
23 aperture for receiving a center tool
24 aperture for receiving a center tool
25 inner side of the guide washer 2
26 inner periphery of the guide washer 2

The invention claimed is:

1. A guide washer assembly (1) of a planet carrier for a planetary transmission, the guide washer assembly (1) comprising:
first and second guide washers (2, 3) interconnected and arranged parallel to each other by a plurality first connecting elements,
each of the plurality of first connecting elements being a deformation in a first one of the first and the second guide washers (2, 3) and each deformation having one of a vaulted and tapered geometry with an internal cavity continuous with a corresponding connecting element aperture in the first one of the first and the second guide washers and a free end extending away from the first one of the first and the second guide washers (2, 3,
a second one of the first and the second guide washers (2, 3) having a plurality of mating receiving apertures (10) which receive corresponding free ends of the first plurality of connecting elements (4, 5, 6) and connect the first and the second guide washers (2, 3) with one another, and
the first and the second guide washers including three pairs of opposed apertures located between adjacent pairs of the connecting elements, a supporting axle extends between each of the pair of opposed apertures in the first and the second guide washers, and each supporting axle carries a rotatable planetary gear.

2. The guide washer assembly according to claim 1, wherein the free ends of the plurality of first connecting elements (4, 5, 6) are connected to the second one of the first and second guide washers (2,3) by at least one of welding and flush riveting.

3. The guide washer assembly according to claim 1, wherein the free end of each of the plurality of first connecting elements (4, 5, 6) has a diameter equal to or smaller than a diameter of a corresponding receiving aperture (10) in the second one of the first and the second guide washers (2, 3).

4. The guide washer assembly according to claim 1, wherein the free end of each connecting element of the first plurality of connecting elements has a shoulder which abuts with a surface of the second one of the first and second guide washers and prevents further insertion of the connecting element of the first plurality of connecting elements into the receiving aperture of the second one of the first and second guide washers.

5. The guide washer assembly according to claim 1, wherein at least said connecting elements (4, 5, 6) are produced by a manufacturing process comprising at least one of cold-hammering, deep drawing and precision blanking.

6. The guide washer assembly according to claim 1, wherein the connecting elements (4, 5, 6) are connected to the second guide washer by at least one of caulking, riveting, soldering, welding, extrusion and a snap ring gripping in a peripheral groove on the free end of the connecting elements (4, 5, 6).

7. The guide washer assembly according to claim 1, wherein at least one of the first and second guide washers (2, 3) includes at least one centering and assembly aperture (22, 23, 24) for facilitating passage of one of a centering and an assembly tool therethrough.

8. The guide washer assembly according to claim 1, wherein the cavities of the connecting elements are adapted to receive an assembly tool to support at least the first guide washer during assembly of the guide washer assembly.

9. The guide washer assembly according to claim 1, wherein at least one of the first and second guide washers includes a peripheral outer toothing formed in at least a peripheral segment of at least one of the first and second guide washers.

10. A guide washer assembly (1) of a planet carrier for a planetary transmission, the guide washer assembly (1) comprising:

first and second guide washers (2, 3) being interconnected and arranged parallel to one another by a plurality of connecting elements; and the plurality of connecting elements being integral components of at least one of the first and the second guide washers (2, 3);

wherein the plurality of connecting elements (4, 5, 6) are formed as deformations in a surface of the at least one of the first and the second guide washers (2, 3), and each deformation has one of a vaulted and a tapered geometry; and at least one of the first and the second guide washers (2, 3) has at least three mating receiving apertures (10) each receiving a free end of one of the plurality of connecting elements (4, 5, 6) and connecting the first and the second guide washers (2, 3) with one another, and the free end of each of the plurality of connecting elements is smaller than the mating receiving aperture (10) to facilitate at least partially receiving of the free end of one of the plurality of connecting elements (4, 5, 6) within the mating receiving aperture (10); and the first and the second guide washers including three pairs of opposed apertures located between adjacent pairs of the connecting elements, a supporting axle extends between each pair of opposed apertures in the first and the second guide washers, and each the supporting axle carries a rotatable planetary gear.

11. A guide washer assembly (1) of a planet carrier for a planetary transmission, the guide washer assembly (1) comprising:

first and second guide washers (2, 3) being interconnected and arranged parallel to one another by at least three connecting elements; and the at least three connecting elements being an integral components of at least one of the first and the second guide washers (2, 3);

wherein the plurality of connecting elements (4, 5, 6) are formed as deformations in the at least one of the first and the second guide washers (2, 3)), and each deformation has one of a vaulted and a tapered geometry; and at least one of the first and the second guide washers (2, 3) has at least three mating receiving apertures (10) for each receiving a free end of one of the plurality of connecting elements (4, 5, 6) and interconnecting the first and the second guide washers (2, 3) with one another, and the free end of each of the plurality of connecting elements is smaller than the mating receiving aperture to facilitate receiving thereof and each has annular shoulder which abuts against a surface of at least one of the first and the second guide washers; and the first and the second guide washers including aligned opposed apertures located between the connecting elements, and a supporting axle extends between the aligned opposed apertures of the first and the second guide washers and carries a rotatable planetary gear.

* * * * *